Aug. 15, 1939.   B. H. BROWALL   2,169,629
BRAKING APPARATUS
Filed Oct. 20, 1936   3 Sheets-Sheet 2

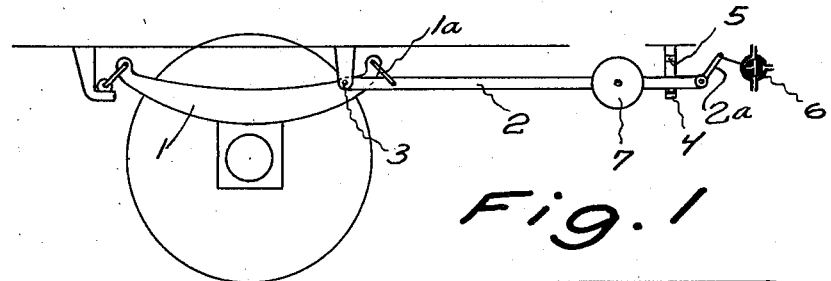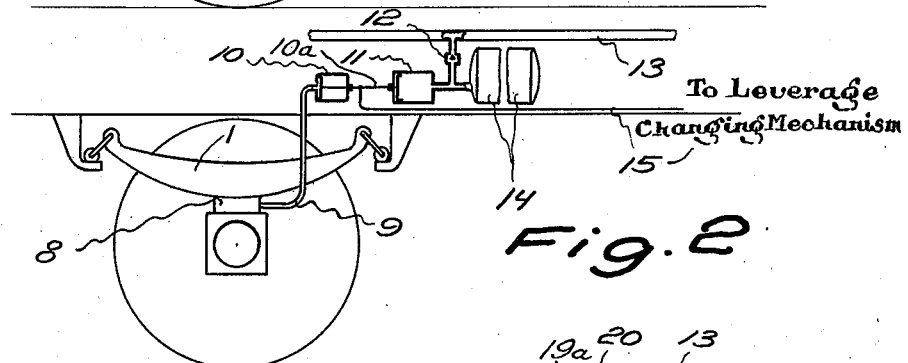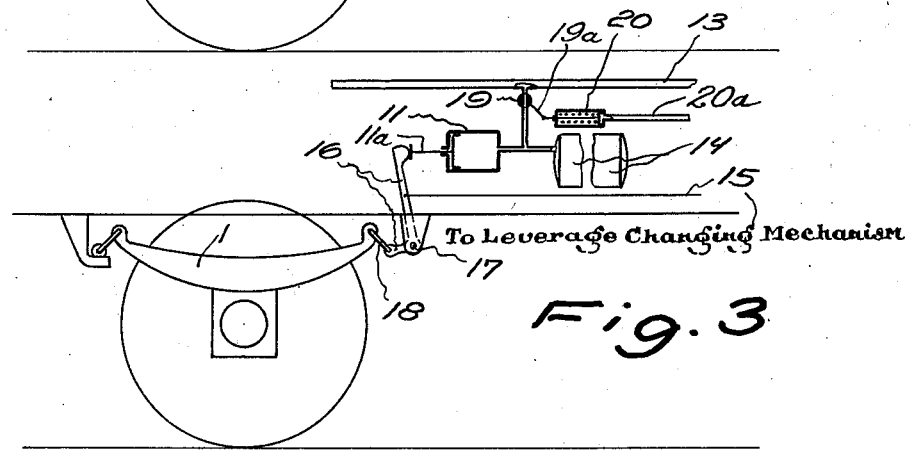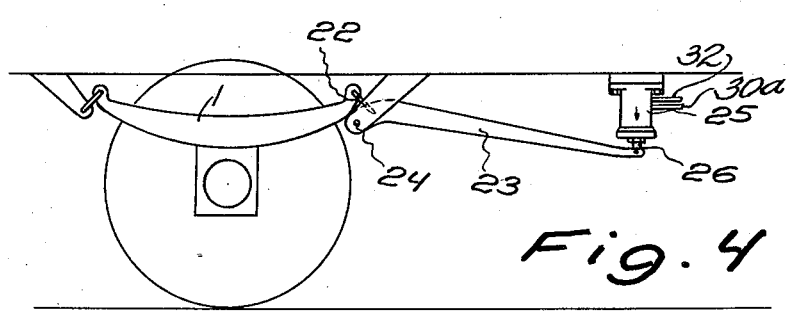

Inventor
B. H. Browall
By C. F. Wenderoth
Att'y.

UNITED STATES PATENT OFFICE 2,169,629

BRAKING APPARATUS

Bert Henry Browall, Malmo, Sweden, assignor to Svenska Aktiebolaget Bromsregulator, Malmo, Sweden, a corporation of Sweden Application October 20, 1936, Serial No. 106,662
In Germany October 24, 1935

8 Claims. (Cl. 188—195)

This invention relates to braking apparatus, for instance fluid pressure braking apparatus, for railway or other vehicles of the kind in which the apparatus is arranged to be set in a different operative condition giving a braking effort of a higher order when the vehicle is loaded, the said different operative condition being obtained for instance, by cutting in an additional brake cylinder, a higher fluid pressure to the brake cylinder, or a higher brake applying leverage of the brake rigging.

In braking apparatus of this kind it is usual to set the braking apparatus for the lower or the higher braking effort manually by means of a handle on the side of the vehicle. But many devices have also been proposed for setting the braking apparatus for the lower or the higher braking automatically in dependence upon the load of the vehicle. In most of these known devices the deflection of the supporting springs of the vehicle, which is proportional to the load of the vehicle, has been utilized for effecting the automatic setting of the braking apparatus, but the function of such devices has been found to suffer from the draw-back that it is disturbed by the play of the supporting springs when the vehicle is running and also by the fact that the supporting springs settle down in the course of their life.

In order to get round this draw-back it has also been proposed to arrange for automatic setting of a braking apparatus in dependence upon the load of the vehicle by means of a special lever mechanism which is influenced by the supporting spring pressure and at increasing load of the vehicle moves against the action of a counterbalance which increases with the load on the vehicle and balances the supporting spring pressure influence on the lever mechanism in all positions thereof. Such a lever mechanism, however, because it takes a new position for every new value of the load of the vehicle, is suitable for use only in connection with a braking apparatus of the kind in which provision is made for a progressive variation of the braking effort, either by means of a specially constructed pressure fluid controlling valve device allowing a progressive variation of the fluid pressure to the brake cylinder, or by means of a variable leverage mechanism of the type allowing a progressive variation of the brake applying leverage of the brake rigging. But in most vehicles the fluid controlling valve device is not of such a special construction, and a variable leverage mechanism which allows a progressive variation of the brake applying leverage of the brake rigging is relatively complicated and suffers also from other draw-backs.

Consequently, for the sake of simplicity and reliability, in most cases it is most advantageous to use a braking apparatus of the kind which is arranged to be set selectively in one or the other of only two different operative conditions one of which gives a lower braking effort suited to empty vehicle and the other of which gives a higher braking effort suited to loaded vehicle, the apparatus being set in the operative condition giving the higher braking effort when the load of the vehicle reaches a predetermined value. The present invention relates exclusively to braking apparatus of this kind.

The two different braking efforts desired may be obtained in a very simple and reliable manner for instance by incorporating in the brake rigging a leverage changing mechanism of the type arranged to be set in one or the other of two different conditions for selectively producing two different brake applying leverages of the brake rigging. A leverage changing mechanism of this type, however, cannot advantageously be set automatically by means of a supporting spring pressure influenced lever mechanism of the previously known balanced type hereinbefore referred to, because such a mechanism takes a highly fluctuant position and, consequently, would make the setting of the leverage changing mechanism correspondingly fluctuant, should the load of the vehicle come in the neighbourhood of the predetermined value at which change from one to the other of the two different operative conditions of the leverage changing mechanism is intended to take place.

The object of the present invention is to provide, in combination with a braking apparatus which can be set in one or the other of two different operative conditions for selectively producing a lower or a higher braking effort, an automatic setting mechanism by which the braking apparatus is held definitely in the operative condition for producing the lower braking effort as long as the load of the vehicle does not exceed a predetermined value, and by which the braking apparatus is definitely set and held into the operative condition for producing the higher braking effort as soon and as long as the load of the vehicle exceeds the said predetermined value, the braking apparatus being automatically reset into the first mentioned condition as soon as the load of the vehicle is again reduced below the said predetermined value. For this purpose the automatic setting mechanism according to the invention comprises an actuating device comprising a member, for instance a lever or a piston, which is movable between two end positions and when moved in one or the other of these two end positions sets the braking apparatus in one or the other of its two different operative conditions, the movements of the said movable member being caused by two counter-acting forces one of which varies in proportion to the load of the vehicle and tends to move and hold the said member in the end position in which the braking apparatus is set in the operative condition giving the higher braking effort, and the other of which tends to move and hold the movable member in the end position in which the braking apparatus is set in the operative condition giving the lower braking effort, the last-mentioned force being of such a nature that it remains practically constant in all possible positions of the movable member, and of such an order that it is overcome by the first-mentioned force only when the load of the vehicle exceeds the predetermined value.

Besides of performing the setting of the braking apparatus in a very definite and reliable manner and making possible a simple and practical construction, this automatic actuating device also has the advantage that special precautions otherwise required for damping or repressing disturbing movements in most cases will be found unnecessary.

In order that the invention may be readily understood it will now be described by way of examples only with reference to the accompanying drawings in which:—

Fig. 1 is a diagrammatic side view of an embodiment of the invention in which a weight is used for producing the constant force corresponding to the predetermined value of the vehicle load.

Figs. 2 and 3 are diagrammatic side views of two different embodiments of the invention in which air pressure is used for producing the constant force corresponding to the predetermined value of the vehicle load.

Fig. 4 is a diagrammatic side view in which a compressed spring is used for producing the constant force corresponding to the predetermined value of the vehicle load.

Figure 6:
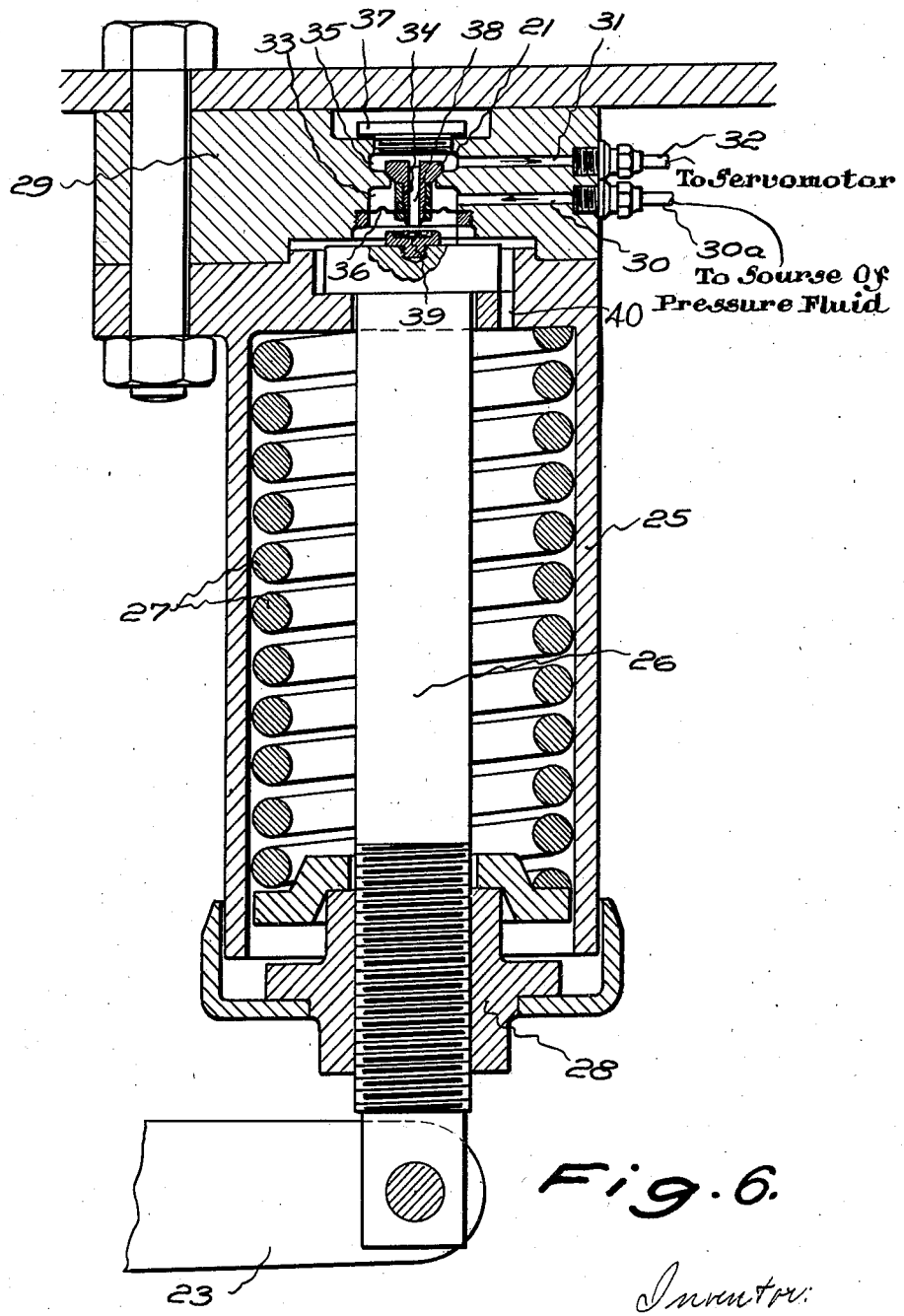
Fig. 6 is a detail sectional view on a larger scale of a part of Fig. 4.

Referring now in the first place to Fig. 1 of the drawings it will be seen that a proportion of the weight of the vehicle is transferred, in a manner known per se, through a supporting spring 1 and a suspension link 1a therefor to a lever 2 which is pivoted to the frame of the vehicle at 3. This lever 2 is movable between two end positions determined by two stops 4 and 5, and the lever 2 is connected by a linkage 2a to a valve 6 which may serve for cutting in and out an additional brake cylinder arranged for instance as shown in Fig. 6 of the U. S. Patent No. 1,107,505. The connection is such that the valve is opened for cutting in the additional brake cylinder when the lever is moved into its upper end position, whereas the valve is closed for cutting out the additional brake cylinder when the lever is moved into its lower end position. The additional brake cylinder in the usual way serves the purpose of assisting the main brake cylinder in order to produce the desired higher braking effort when the vehicle is loaded.

The lever 2 is loaded with a weight 7 the force of which on the lever remains practically constant in all possible positions of the lever. As long as the load of the vehicle is below the predetermined value at which the additional brake cylinder is to be cut in for putting the braking apparatus in the different operative condition giving the higher braking effort suited to loaded vehicle, the lever 2 remains in its lower end position in which the braking apparatus is set in the operative condition giving the lower braking effort suited to empty vehicle. When the load of the vehicle is increased above the aforesaid predetermined value the lever 2 is moved all at once into its upper end position and thereby performs the setting of the braking apparatus in the operative condition giving the higher braking effort in a definite and reliable manner. Preferably the stops 4 and 5 may be provided with rubber cushions or the like. For the purpose of adjusting the value of the load of the vehicle, at which the setting of the braking apparatus in the operative condition giving the higher braking effort is to take place, the weight 7 may be adjustable on the lever 2.

Figure 5:
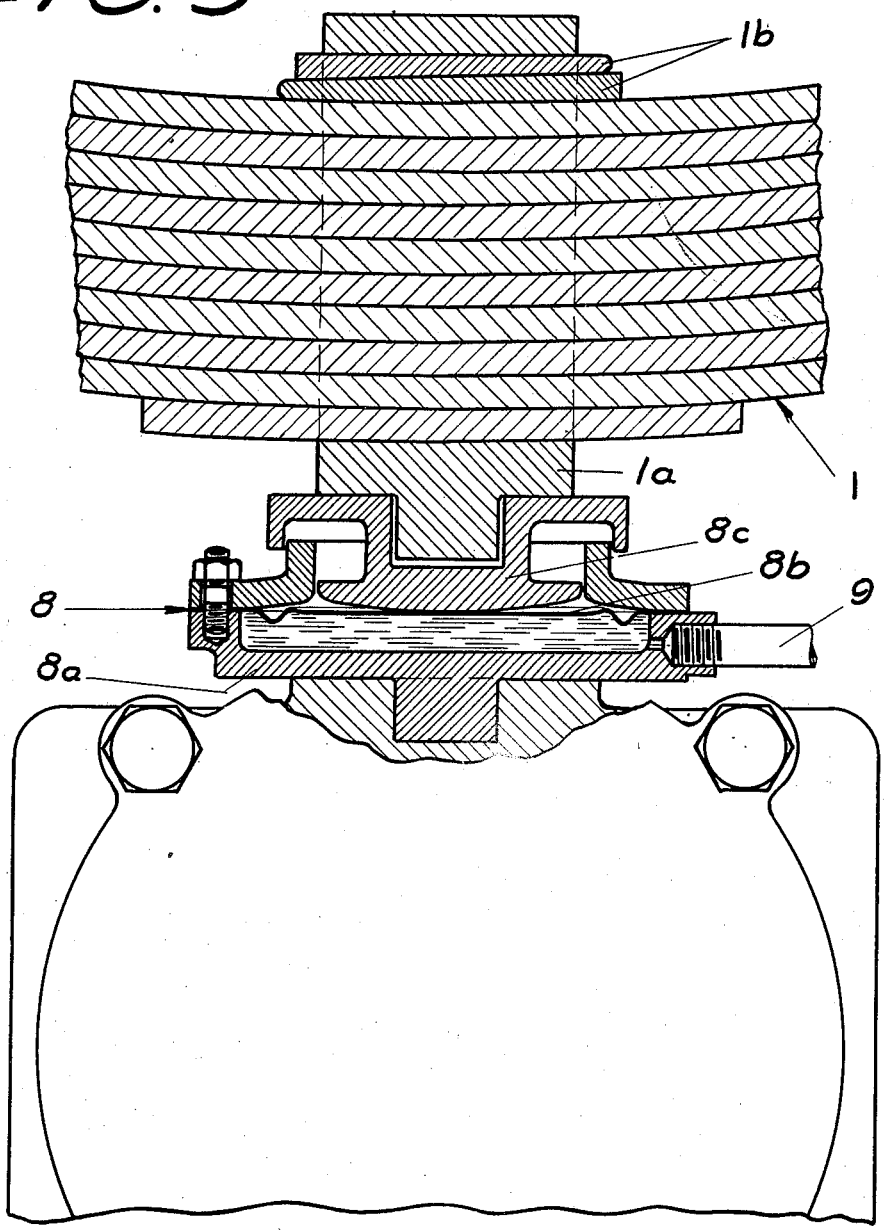
Fig. 5 is a detail sectional view on a larger scale of a part of Fig. 2.

Referring now to the embodiment of the invention illustrated in Figs. 2 and 5 it will be seen that a proportion of the weight of the vehicle is transferred to an oil pressure transmitter 8 placed, for instance, under one of the supporting springs of the vehicle and connected by means of a flexible conduit 9 with a small cylinder 10. According to the illustrative example shown in Fig. 5 the oil pressure transmitter 8 is in the form of a cup 8a filled with oil and closed with a diaphragm 8b on which the spring 1 rests with a stud 8c. According to the illustrative example shown in Fig. 5 the oil pressure transmitter 8 is in the form of a cup 8a filled with oil and closed with a diaphragm 8b on which rests a stud 8c forming a support for the usual spring buckle 1a which is secured on the spring 1 by means of wedges 1b. The piston of the cylinder 10 is connected by means of a rod 10a with the piston of a second cylinder 11 which is connected through a non-return valve 12 to the brake pipe 13. The cylinder 11 is also connected to a pressure preserving reservoir 14. This reservoir and the cylinder 11 are under the full brake pipe pressure. When the pressure in the brake pipe is lowered for performing a braking operation the non-return valve 12 closes and prevents falling of the pressure in the cylinder 11 and the pressure preserving reservoir 14. Consequently, the action of the brake pipe pressure on the piston of the cylinder 11 represents a practically constant force which overcomes the force of the oil pressure from the oil pressure transmitter 8 on the piston of the cylinder 10 until the load of the vehicle reaches the predetermined value at which setting of the braking apparatus in the different condition for producing the higher braking effort is to take place. When the load of the vehicle reaches this predetermined value the piston of the cylinder 10 is moved all at once into its other end position and thereby influences for instance a leverage changing mechanism which is incorporated in the brake rigging, in this case setting said mechanism for producing a higher brake applying leverage of the brake rigging, whereby the higher braking effort suited to loaded vehicle is obtained. The piston of the cylinder 10 is connected with the leverage changing mechanism by means of a rod 15. The leverage changing mechanism should be of the type for selectively producing two different brake applying leverages, that is a lower brake applying leverage suited to empty vehicle and a higher brake applying leverage suited to loaded vehicle. Several constructions of leverage changing mechanism of this type are well known in the art, and since the construction of the leverage changing mechanism forms no part of this invention this mechanism is not shown in the drawings. The embodiment of the invention now described, besides of ensuring a definite and reliable setting of the leverage changing mechanism on the higher brake applying leverage stage, has the further advantage that the value of the load of the vehicle, at which the cutting in of the higher braking effort takes place, automatically adjusts itself to the service fluid pressure of the brake and thereby to the available braking power.

The embodiment of the invention shown in Fig. 3 differs from that shown in Fig. 2 insofar as the transmission of a proportion of the weight of the vehicle on the piston of the cylinder 11 is effected by means of bell crank lever 16 which is pivoted at 17 and abuts the rod 11a of the piston in the cylinder 11 and to which the supporting spring suspension link 18 is attached. Further the non-return valve of Fig. 2 in the connection between the brake pipe 13 and the cylinder 11 and the pressure preserving reservoir 14 is substituted by a check-valve 1, and preferably this connection is throttled. The check-valve 19 is controlled by a small cylinder 20 which is connected by means of a pipe 20a to the brake cylinder so that the check-valve is closed when a braking operation is performed, the valve 19 being connected to the rod of the piston in the cylinder 20 by means of a lever 19a.

In the embodiment of the invention illustrated in Figs. 4 and 6 the switching for instance of the leverage changing mechanism on to the higher brake applying leverage stage when the load of the vehicle reaches the predetermined value is performed by means of a servo-motor the operation of which is controlled by a valve 21 (Fig. 6) which in turn is controlled by the automatic actuating device according to the invention. As illustrated in Fig. 4 the automatic actuation device comprises a supporting spring suspension link 22 attached to a lever 23 pivoted at 24. In a fixed spring casing 25 there is an axially movable bolt 26 to which the free end of the lever 23 is attached. The spring 27 in the casing 25 is placed under such an initial tension between the upper end wall of the casing and a collar 28 screwed on the bolt 26 that the spring 27 does not yield until the load of the vehicle exceeds a predetermined value. The initial tension of the spring and thereby the value of the load of the vehicle, at which the leverage changing mechanism will be set on the higher brake applying leverage stage, can be adjusted by screwing the collar 28 up or down on the bolt 26. When the load of the vehicle exceeds the predetermined value the spring 27 yields so that the bolt 26 is moved upwards by the lever 23 and opens the valve 21 which is housed in a member 29 interposed between the vehicle frame and the casing 25 attached thereto. When the valve 21 is opened it connects with each other two channels 30 and 31. The channel 30 is connected by means of a pipe 30a to some source of pressure fluid of the brake, and the channel 31 is connected to a pipe 32 leading to the servo-motor which is not shown in the drawings because it may be of any suitable construction and because the construction thereof does not form part of this invention. The channels 30 and 31 open into chambers 33 and 35 on opposite sides of the seat of the valve 21. The chamber 33 which is connected to the channel 30 and always is under fluid pressure is closed on its under side facing the upper end of the bolt 26 by means of a flexible diaphragm 36 tightly fitted both to the surrounding wall of the chamber and to the stem 34 of the valve 21. Consequently, the valve 21, when not acted upon by the bolt 26, is positively held in closed position by the action of the fluid pressure in the chamber 33 on the diaphragm 36. The chamber 35 is closed at its upper end by a screw plug 37. The valve 21 and the stem 34 thereof are provided with an axial bore 38 for allowing escape of pressure fluid from the chamber 35, the channel 31, the pipe 32, and the servo-motor to the atmosphere through a port 40. The opening of the bore 38 facing the upper end of the bolt 26 is closed by a washer or other closing member 39 on the upper end of the bolt 26 when the latter is raised for lifting the valve 21 off from its seat. In this manner escape of pressure fluid through the bore 38 from the chamber 33 is prevented when the valve 21 opens communication between the chamber 35 and the chamber 33. Consequently, the pressure fluid from the chamber 33, which as soon as the valve 21 is opened flows to the servo-motor and actuates the latter for switching over the changing mechanism to the higher braking effort stage, will continue to act on the servo-motor so as to maintain the changing mechanism on the higher braking effort stage as long as the lever 23 holds the bolt 26 raised against the action of the spring 27 and thereby holds the valve 21 open. When the load of the vehicle is reduced below the predetermined value the spring 27 again overcomes the influence of the load of the vehicle on the lever 23 so that the bolt 26 leaves the valve 21 and opens the bore 38, thereby allowing escape of the pressure fluid from the servo-motor and return of the changing mechanism to the lower braking effort stage under the action of a return spring not shown. Because the movement of the bolt 26 for lifting and lowering the valve 21 is very small in relation to the length of the spring 27 the force of this spring on the lever 23 remains practically constant in all possible positions of the lever so that full raising of the valve 21 takes place all at once as soon as the load of the vehicle is increased above the predetermined value and full lowering of the valve 21 takes place all at once as soon as the load of the vehicle is reduced below the predetermined value.

What I claim and desire to secure by Letters Patent is:

1. In combination with a vehicle having supporting springs, a device for automatically setting a braking apparatus for the vehicle, which is of the kind arranged to be set selectively in one or the other of two different operative conditions one of which gives a lower braking effort and the other of which gives a higher braking effort, in the condition giving the higher braking effort when the load of the vehicle is increased above a predetermined value, and for automatically resetting the braking apparatus in the condition giving the lower braking effort when the load of the vehicle is again reduced below said predetermined value, which device comprises two abutments, a member movable between said abutments and adapted, when moved into contact with one or the other of these two abutments, to set the braking apparatus in one or the other of its two different operative conditions, means acted upon by the vehicle supporting spring pressure and adapted to exert on said movable member a force increasing with the vehicle supporting spring pressure and tending to move and hold said movable member in contact with the abutment corresponding to the operative condition giving the higher braking effort, and means for exerting on said movable member a force which remains practically constant in all possible positions of said movable member and tends to move and hold said movable member in contact with the abutment corresponding to the operative condition giving the lower braking effort, the arrangement being such that said movable member contacts with one or the other of said abutments according to whether said first mentioned force overcomes or is overcome by said last mentioned practically constant force.

2. A device as claimed in claim 1, in which the movable member consists of a lever pivoted to the vehicle frame and acted upon in one direction by a proportion of the vehicle supporting spring pressure and in the opposite direction by a practically constant load.

3. A device as claimed in claim 1, in which the movable member consists of a lever in one point pivoted to the vehicle frame and in another point pivoted to a member connected with the supporting springs of the vehicle, whereby the said lever is acted upon in one direction by a proportion of the weight of the vehicle supported by said supporting springs, and in which the lever is acted upon in the opposite direction by a load remaining practically constant in all possible positions of the lever.

4. A device as claimed in claim 1, in which the movable member consists of a lever pivoted to the vehicle frame and acted upon in one direction by a proportion of the vehicle supporting spring pressure and in the opposite direction by an opposing spring which is under tension and the length of which is very great in relation to the possible movement of the lever so that the force exerted by the last mentioned spring on the lever remains practically constant in all possible positions of the lever.

5. A device as claimed in claim 1, in which the practically constant force on the movable member is created by fluid pressure on the piston of a cylinder connected to a brake pipe through a valve adapted to prevent back-flow of pressure fluid from said cylinder to the brake pipe when the pressure in the latter is lowered for performing a braking operation, the said cylinder having connected to it a pressure preserving reservoir.

6. A device as claimed in claim 1, in which the movable member consists of the piston of a cylinder connected to a fluid pressure transmitter acted upon by a proportion of the weight reposing upon the supporting springs of the vehicle.

7. A combination as claimed in claim 1, in which the movable member is adapted, when moving in one or the other of its end positions, to shift a valve for admitting pressure fluid to or allowing escape thereof from a servo-motor for effecting the setting of the braking apparatus.

8. A combination as claimed in claim 1, in which the movable member consists of a lever pivoted to the vehicle frame and acted upon in one direction by a proportion of the vehicle supporting spring pressure, said lever having attached thereto one end of a bolt axially slidable in a casing secured to the vehicle frame and containing a spring inserted under tension between an end wall of the casing and an adjustable collar on the bolt and acting on the lever in opposite direction to the said proportion of the vehicle supporting spring pressure, the bolt being adapted to actuate a valve controlling an opening between two chambers one of which is adapted for connection to a pressure fluid source and is closed on one side facing the other end of the bolt by means of a flexible diaphragm to which the valve is attached, the other of said chambers being adapted for connection with a servomotor for effecting the setting of the braking apparatus in the operative condition giving the higher braking effort when the valve is actuated by the said bolt, and said valve having a bore to allow escape of pressure fluid from the second-mentioned chamber when the valve closes the opening between the two chambers, which bore is closed by the bolt when the latter actuates the valve.

BERT HENRY BROWALL.